US012784988B2

(12) United States Patent
Nishibayashi et al.

(10) Patent No.: US 12,784,988 B2
(45) Date of Patent: Nov. 3, 2026

(54) MULTILAYER CERAMIC CAPACITOR

(71) Applicant: Murata Manufacturing Co., Ltd., Nagaokakyo (JP)

(72) Inventors: Kazuhiro Nishibayashi, Nagaokakyo (JP); Yuki Koyama, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 145 days.

(21) Appl. No.: 18/758,027

(22) Filed: Jun. 28, 2024

(65) Prior Publication Data

US 2024/0355550 A1 Oct. 24, 2024

Related U.S. Application Data

(63) Continuation of application No. PCT/JP2023/015058, filed on Apr. 13, 2023.

(30) Foreign Application Priority Data

May 20, 2022 (JP) ................................ 2022-083016

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/1227* (2013.01); (Continued)

(58) Field of Classification Search
CPC .......... H01G 4/30; H01G 4/008; H01G 4/005; H01G 4/1227; H01G 4/1236; H01G 4/224; H01G 4/228; H01G 4/35
(Continued)

(56) References Cited

U.S. PATENT DOCUMENTS 8,451,580 B2 * 5/2013 Chung .................. H01G 4/012 361/311
11,404,214 B2 * 8/2022 Okuda .................. H01G 4/012
(Continued)

FOREIGN PATENT DOCUMENTS

JP 2008091400 A 4/2008
JP 2008294298 A 12/2008
(Continued)

OTHER PUBLICATIONS

International Search Report in PCT/JP2023/015058, mailed Jun. 20, 2023, 3 pages.
(Continued)

*Primary Examiner* — Arun Ramaswamy
(74) *Attorney, Agent, or Firm* — Keating & Bennett, LLP

(57) ABSTRACT

In a multilayer ceramic capacitor, a dimension of each of first and second extension portions in a width direction is less than a dimension of a first counter electrode portion in the width direction, and a dimension from a side of each of the first and second extension portions near a first lateral surface to the first lateral surface in the width direction and a dimension from a side of each of the first and second extension portions near a second lateral surface to the second lateral surface in the width direction are each greater than the dimension of each of the first and second extension portions in the width direction.

19 Claims, 7 Drawing Sheets

(51) Int. Cl.

| | |
|---|---|
| ***H01G 4/12*** | (2006.01) |
| ***H01G 4/224*** | (2006.01) |
| ***H01G 4/228*** | (2006.01) |
| ***H01G 4/35*** | (2006.01) |

(52) U.S. Cl.
CPC ........... *H01G 4/1236* (2013.01); *H01G 4/224* (2013.01); *H01G 4/228* (2013.01); *H01G 4/35* (2013.01)

(58) Field of Classification Search
USPC ............. 361/301.4, 303, 306.3, 321.1, 321.3
See application file for complete search history.

(56) References Cited

U.S. PATENT DOCUMENTS

| | | | | |
|---|---|---|---|---|
| 2012/0073129 | A1 | 3/2012 | Abe et al. | |
| 2017/0345571 | A1* | 11/2017 | Imaeda | H01G 4/248 |
| 2018/0108480 | A1* | 4/2018 | Fujii | H01G 4/012 |
| 2018/0286583 | A1 | 10/2018 | Onoue et al. | |
| 2019/0371525 | A1 | 12/2019 | Zaima et al. | |
| 2020/0411237 | A1* | 12/2020 | Kim | H01G 4/012 |
| 2021/0104364 | A1 | 4/2021 | Okuda | |

FOREIGN PATENT DOCUMENTS

| | | | |
|---|---|---|---|
| JP | 2012094819 | A | 5/2012 |
| JP | 2018170355 | A | 11/2018 |
| JP | 2019212746 | A | 12/2019 |
| JP | 2021061302 | A | 4/2021 |

OTHER PUBLICATIONS

Written Opinion in PCT/JP2023/015058, mailed Jun. 20, 2023, 5 pages.

* cited by examiner

FIG. 7

| | | DIMENSION W' (mm) | DIMENSION A (mm) | DIMENSION B (mm) | DIMENSION W1 (mm) | RELATION BETWEEN DIMENSIONS W1 AND W' | RELATION BETWEEN DIMENSIONS A AND W' | DIMENSION C (mm) | DIMENSION D (mm) | RELATION BETWEEN DIMENSIONS A AND C | DELAMINATION |
|---|---|---|---|---|---|---|---|---|---|---|---|
| Example | 1 | 0.70 | 0.14 | 0.50 | 0.28 | 0.40W' | 0.20W' | 0.20 | 0.80 | 0.70C | ◎ |
| | 2 | 0.70 | 0.18 | 0.50 | 0.26 | 0.375W' | 0.25W' | 0.20 | 0.80 | 0.88C | ◎ |
| | 3 | 0.70 | 0.18 | 0.50 | 0.26 | 0.375W' | 0.25W' | 0.90 | 0.80 | 0.19C | ○ |
| | 4 | 0.70 | 0.21 | 0.50 | 0.25 | 0.35W' | 0.30W' | 0.20 | 0.80 | 1.05C | ○ |
| | 5 | 0.70 | 0.31 | 0.50 | 0.20 | 0.28W' | 0.44W' | 0.20 | 0.80 | 1.55C | ○ |
| Comparative Example | 1 | 0.70 | 0.60 | 0.50 | 0.05 | 0.07W' | 0.86W' | 0.20 | 0.80 | 3.00C | × |

MULTILAYER CERAMIC CAPACITOR

CROSS REFERENCE TO RELATED APPLICATIONS

This application claims the benefit of priority to Japanese Patent Application No. 2022-083016 filed on May 20, 2022 and is a Continuation Application of PCT Application No. PCT/JP2023/015058 filed on Apr. 13, 2023. The entire contents of each application are hereby incorporated herein by reference.

BACKGROUND OF THE INVENTION

1. Field of the Invention

The present invention relates to a multilayer ceramic capacitor.

2. Description of the Related Art

A capacitor has been provided with the aim to reduce cracks in an element or to reduce separation of an element and an external electrode from each other. Japanese Unexamined Patent Application, Publication No. 2018-170355 discloses a capacitor in which the porosity of a sintered electrode layer of an external electrode is adjusted to accomplish the aim.

SUMMARY OF THE INVENTION

Unfortunately, while an increase in the capacitance of a capacitor results in an increase in the number of electrode layers stacked, delamination is not adequately reduced.

Example embodiments of the present invention provide capacitors that each further reduce delamination.

A multilayer ceramic capacitor according to an example embodiment of the present invention including a multilayer body including a plurality of dielectric layers stacked, and a plurality of internal electrode layers each stacked on an associated one of the dielectric layers, the multilayer body including first and second main surfaces that face each other in a lamination direction, first and second end surfaces that face each other in a length direction orthogonal or substantially orthogonal to the lamination direction, and first and second lateral surfaces that face each other in a width direction orthogonal or substantially orthogonal to the lamination direction and the length direction, the plurality of internal electrode layers further including a plurality of first internal electrode layers on the plurality of dielectric layers, the first internal electrode layers extending to the first and second end surfaces, and a plurality of second internal electrode layers on the plurality of dielectric layers, the second internal electrode layers extending to the first and second lateral surfaces, a first external electrode on the first end surface, the first external electrode being connected to the first internal electrode layers, a second external electrode on the second end surface, the second external electrode being connected to the first internal electrode layers, a third external electrode on the first lateral surface, the third external electrode being connected to the second internal electrode layers, and a fourth external electrode on the second lateral surface, the fourth external electrode being connected to the second internal electrode layers, the first internal electrode layers each including a first counter electrode portion that faces an associated one of the second internal electrode layers with one of the dielectric layers interposed between the first counter electrode portion and the associated one of the second internal electrode layers, a first extension portion extending from the first counter electrode portion to the first end surface, and a second extension portion extending from the first counter electrode portion to the second end surface, the second internal electrode layers each including a second counter electrode portion that faces an associated one of the first internal electrode layers with one of the dielectric layers interposed between the second counter electrode portion and the associated one of the first internal electrode layers, a third extension portion extending from the second counter electrode portion to the first lateral surface, and a fourth extension portion extending from the second counter electrode portion to the second lateral surface, a dimension A of each of the first and second extension portions in the width direction being less than a dimension B of the first counter electrode portion in the width direction, a dimension W1 from a side of each of the first and second extension portions near the first lateral surface to the first lateral surface in the width direction and a dimension W2 from a side of each of the first and second extension portions near the second lateral surface to the second lateral surface in the width direction being each greater than the dimension A of each of the first and second extension portions in the width direction.

According to example embodiments of the present invention, it is possible to provide capacitors in which delamination is further reduced.

The above and other elements, features, steps, characteristics and advantages of the present invention will become more apparent from the following detailed description of the example embodiments with reference to the attached drawings.

BRIEF DESCRIPTION OF THE DRAWINGS

FIG. 7 shows the relation between dimensions of different portions and delamination.

DETAILED DESCRIPTION OF THE EXAMPLE EMBODIMENTS

Figure 1:
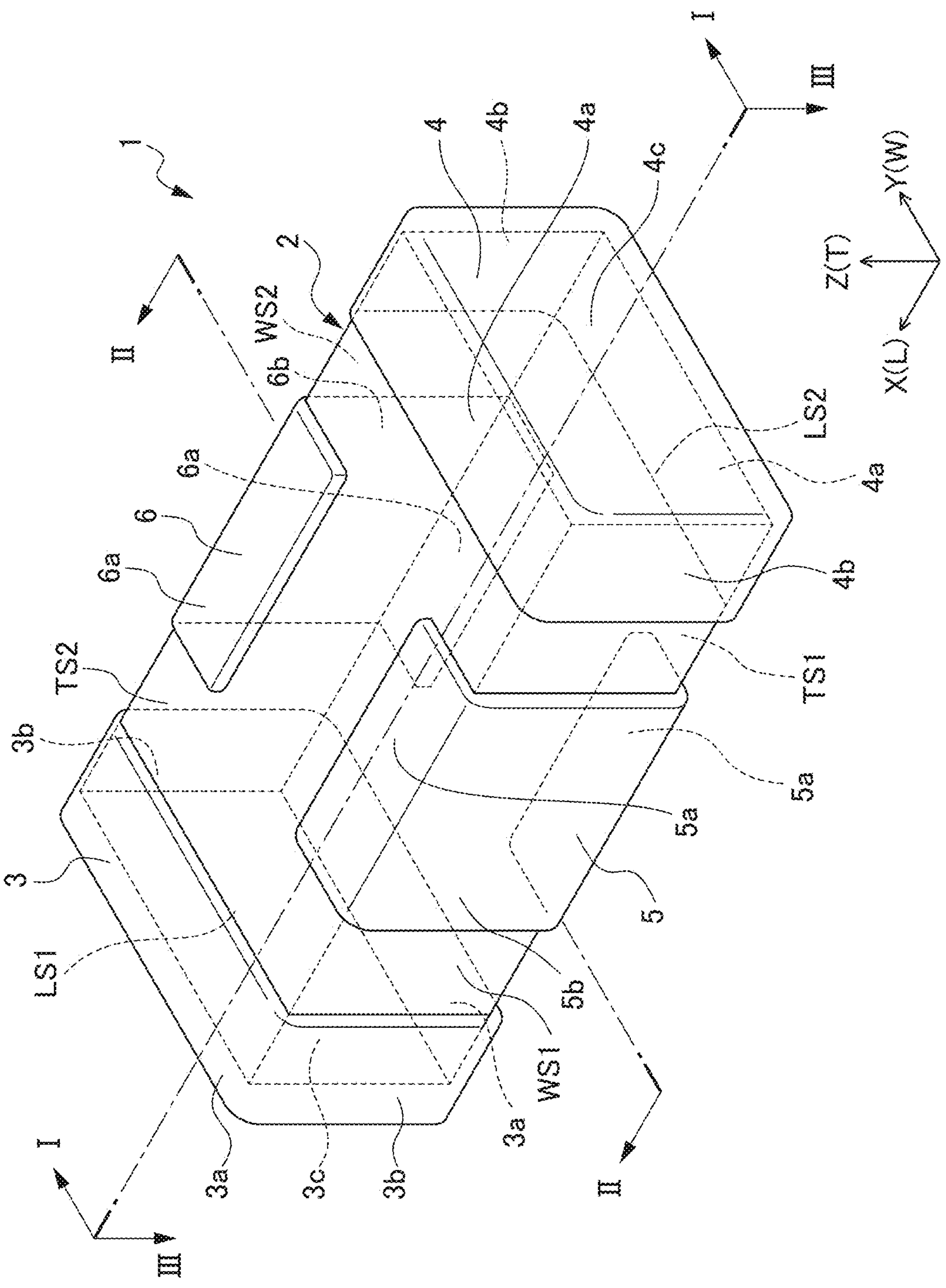
FIG. 1 is a perspective view illustrating a multilayer ceramic capacitor according to an example embodiment of the present invention.

Example embodiments of the present invention will be described below with reference to the accompanying drawings. The same reference numerals are used to represent identical or equivalent elements in figures.

Outline of Structure of Multilayer Ceramic Capacitor

An outline of the structure of a multilayer ceramic capacitor 1 will be described with reference to FIGS. 1 to 4. FIG.

Figure 2:
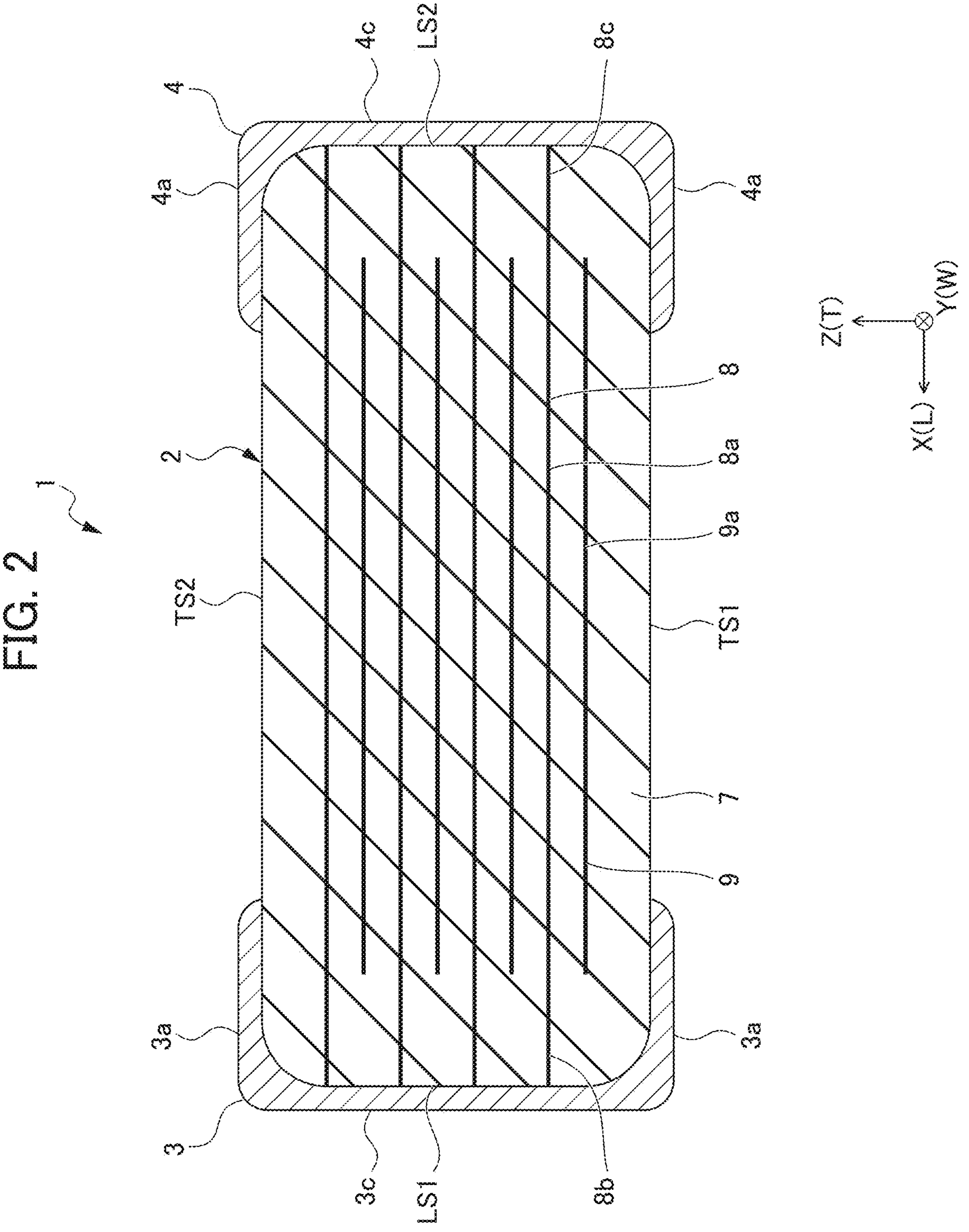
FIG. 2 is a cross-sectional view of the multilayer ceramic capacitor taken along line I-I illustrated in FIG. 1.
Figure 3:
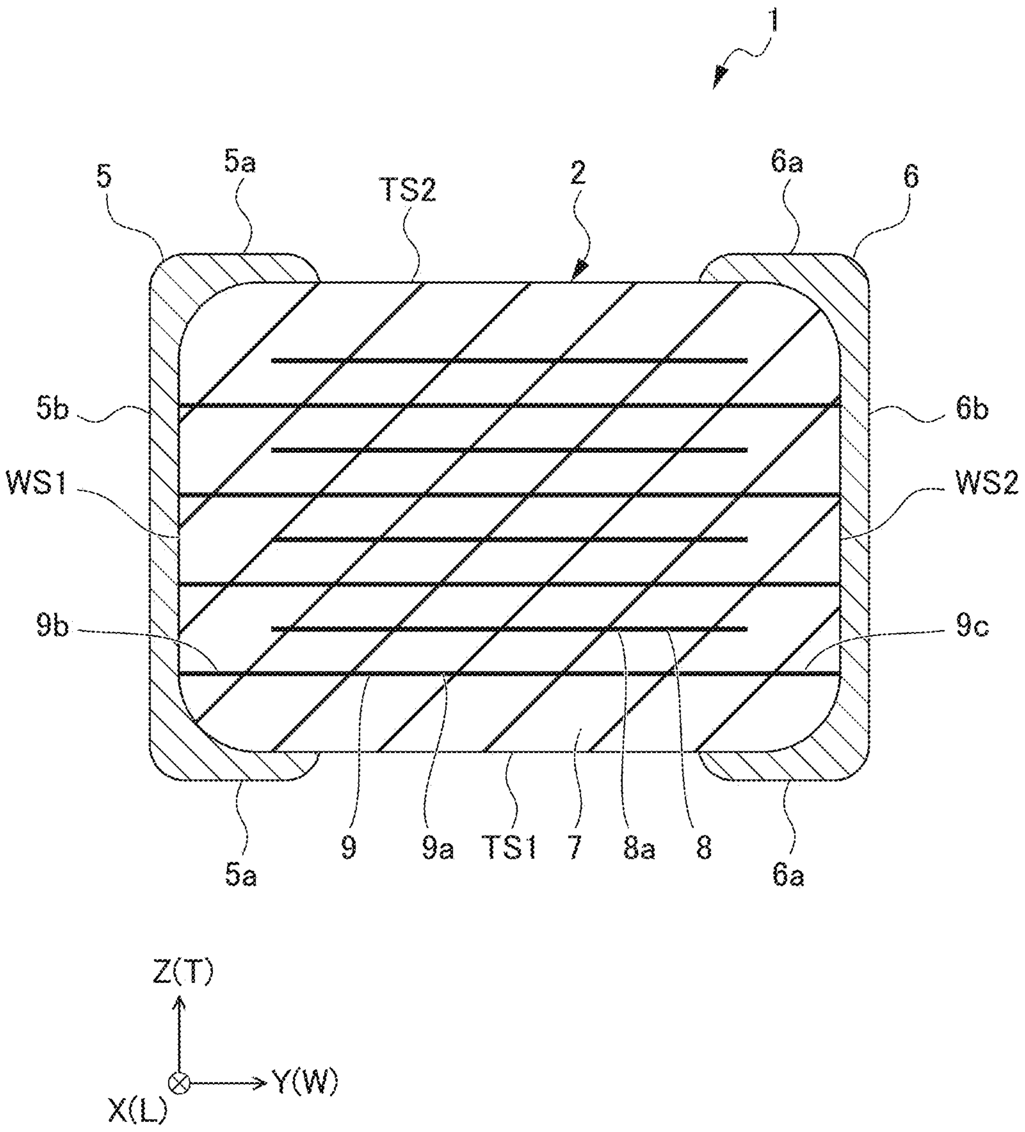
FIG. 3 is a cross-sectional view of the multilayer ceramic capacitor taken along line II-II illustrated in FIG. 1.
Figure 4:
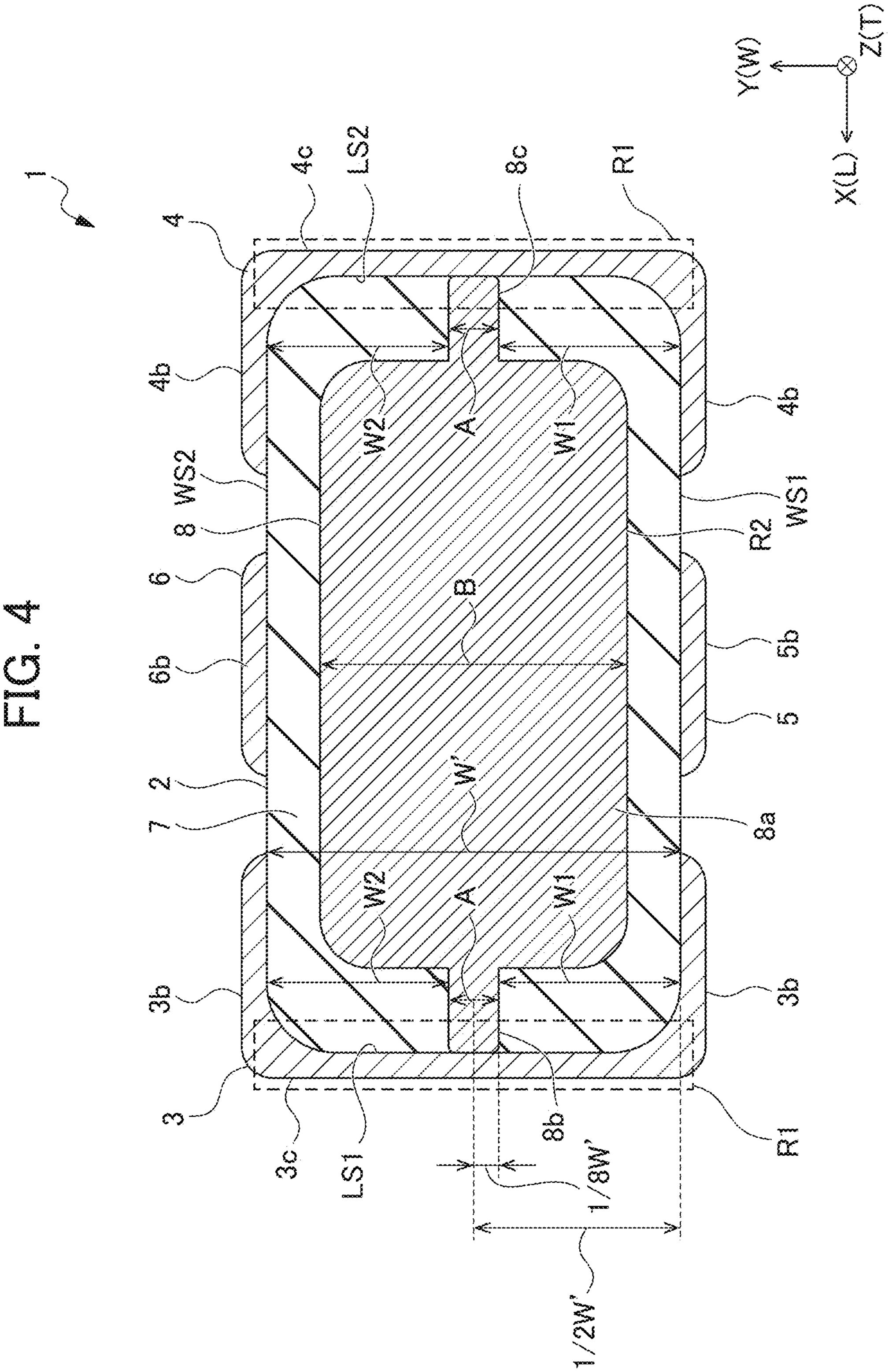
FIG. 4 is a cross-sectional view of the multilayer ceramic capacitor taken along line III-III illustrated in FIG. 1, and illustrates a planar structure of a first internal electrode layer.
Figure 5:
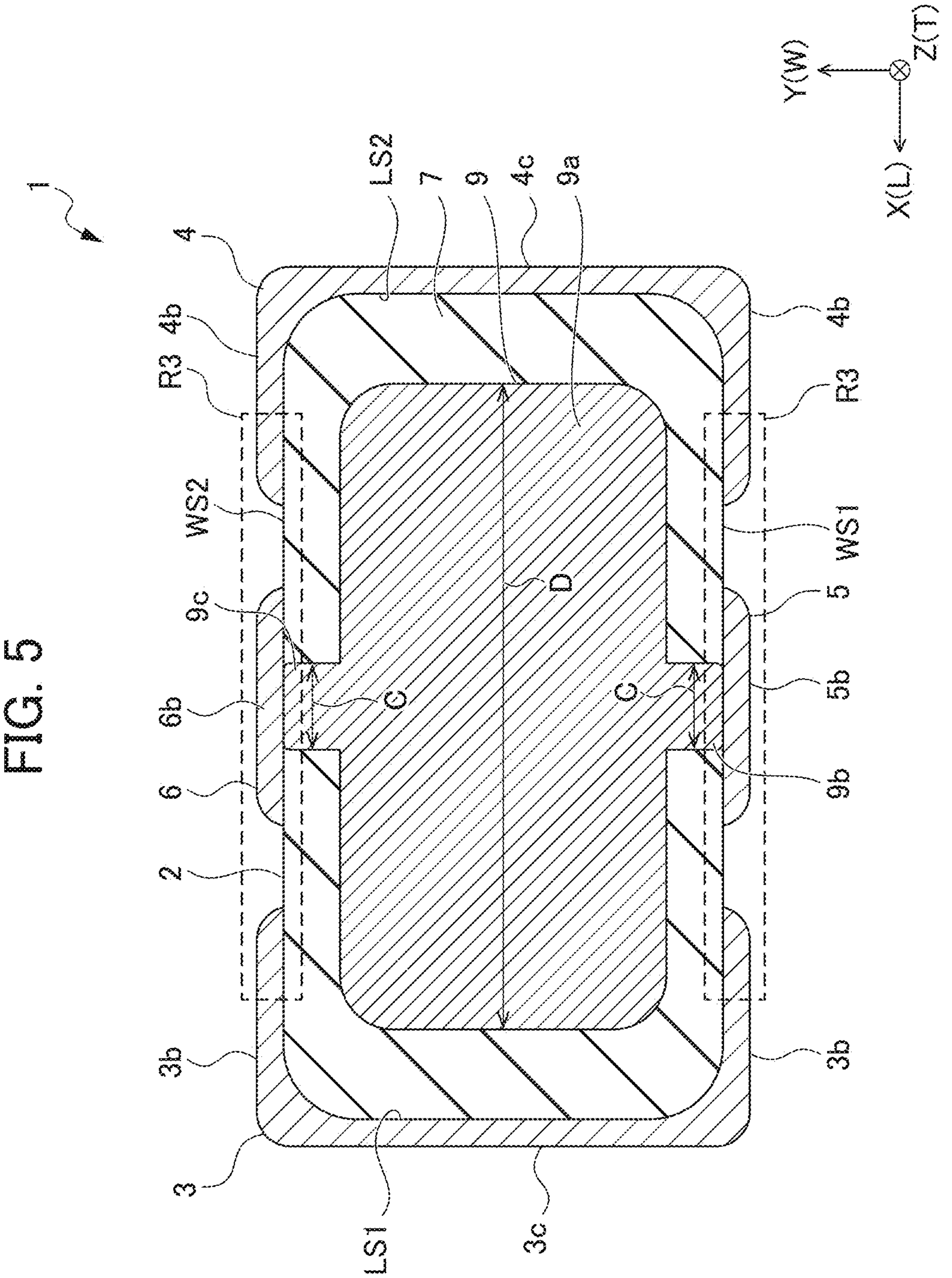
FIG. 5 is a cross-sectional view of the multilayer ceramic capacitor taken along line III-III illustrated in FIG. 1, and illustrates a planar structure of a second internal electrode layer.

1 is a perspective view illustrating a multilayer ceramic capacitor 1 according to this example embodiment, FIG. 2 is a perspective view of the multilayer ceramic capacitor taken along line I-I illustrated in FIG. 1, and FIG. 3 is a cross-sectional view of the multilayer ceramic capacitor taken along line II-II illustrated in FIG. 1. FIGS. 4 and 5 are cross-sectional views of the multilayer ceramic capacitor taken along line III-III illustrated in FIG. 1. FIG. 4 illustrates a planar structure of a first internal electrode layer, and FIG. 5 illustrates a planar structure of a second internal electrode layer. As illustrated in FIG. 1, the multilayer ceramic capacitor 1 includes a multilayer body 2 and external electrodes. The external electrodes include a first external electrode 3, a second external electrode 4, a third external electrode 5, and a fourth external electrode 6.

Definitions of Directions

FIGS. 1 to 5 each illustrate an XYZ orthogonal coordinate system. The X direction is the length direction L of the multilayer ceramic capacitor 1, the Y direction is the width direction W of the multilayer ceramic capacitor 1, and the Z direction is the lamination direction T of the multilayer ceramic capacitor 1. Thus, the cross section illustrated in FIG. 2 is referred to also as the "LT cross section", and the cross section illustrated in FIG. 3 is referred to also as the "WT cross section". The cross section illustrated in each of FIGS. 4 and 5 is referred to also as the "WL cross section". The length direction L, the width direction W, and the lamination direction T are not always orthogonal to one another, and may intersect with one another.

Schematic Configuration of Multilayer Body

As illustrated in FIG. 1, the multilayer body 2 is in the shape of a rectangular or substantially rectangular parallelepiped, and has first and second main surfaces TS1 and TS2 that face each other in the lamination direction T, first and second lateral surfaces WS1 and WS2 that face each other in the width direction W, and first and second end surfaces LS1 and LS2 that face each other in the length direction L. Corners and ridges of the multilayer body 2 are preferably rounded. The corners are portions of the multilayer body 2 at each of which three surfaces of the multilayer body 2 meet, and the ridges are portions of the multilayer body 2 at each of which two surfaces of the multilayer body 2 meet.

External Electrodes

The external electrodes will be described with reference to FIG. 1. The external electrodes include the first external electrode 3, the second external electrode 4, the third external electrode 5, and the fourth external electrode 6 as described above.

First External Electrode

The first external electrode 3 is located on the first end surface LS1 of the multilayer body 2. The first external electrode 3 extends from over the first end surface LS1 to over a portion of the first main surface TS1, a portion of the second main surface TS2, a portion of the first lateral surface WS1, and a portion of the second lateral surface WS2. A portion of the first external electrode 3 located on the first end surface LS1 of the multilayer body 2 is referred to as the "first end surface electrode portion 3*c*", portions of the first external electrode 3 covering the portion of the first main surface TS1 and the portion of the second main surface TS2 are referred to as the "first main surface electrode portions 3*a*", and portions of the first external electrode 3 covering the portion of the first lateral surface WS1 and the portion of the second lateral surface WS2 are referred to as the "first lateral surface electrode portions 3*b*".

Second External Electrode

The second external electrode 4 is located on the second end surface LS2 of the multilayer body 2. The second external electrode 4 has a structure similar to that of the first external electrode 3. Specifically, the second external electrode 4 extends from over the second end surface LS2 to over a portion of the first main surface TS1, a portion of the second main surface TS2, a portion of the first lateral surface WS1, and a portion of the second lateral surface WS2. A portion of the second external electrode 4 located on the second end surface LS2 of the multilayer body 2 is referred to as the "second end surface electrode portion 4*c*", portions of the second external electrode 4 covering the portion of the first main surface TS1 and the portion of the second main surface TS2 are referred to as the "second main surface electrode portions 4*a*", and portions of the second external electrode 4 covering the portion of the first lateral surface WS1 and the portion of the second lateral surface WS2 are referred to as the "second lateral surface electrode portions 4*b*".

Third External Electrode

The third external electrode 5 is located on the first lateral surface WS1 of the multilayer body 2. The third external electrode 5 is located on a portion of the first lateral surface WS1 in the length direction L (specifically, on a central portion of the first lateral surface WS1 in the length direction L) without being located on the entire first lateral surface WS1. The third external electrode 5 extends from over the portion of the first lateral surface WS1 to over a portion of the first main surface TS1 and a portion of the second main surface TS2. A portion of the third external electrode 5 located on the first lateral surface WS1 of the multilayer body 2 is referred to as the "third lateral surface electrode portion 5*b*", and portions of the third external electrode 5 covering the portion of the first main surface TS1 and the portion of the second main surface TS2 are referred to as the "third main surface electrode portions 5*a*".

Fourth External Electrode

The fourth external electrode 6 is located on the second lateral surface WS2 of the multilayer body 2. The fourth external electrode 6 has a structure similar to that of the third external electrode 5. Specifically, the fourth external electrode 6 is located on a portion of the second lateral surface WS2 in the length direction L (specifically, on a central portion of the second lateral surface WS2 in the length direction L) without being located on the entire second lateral surface WS2. The fourth external electrode 6 extends from over the portion of the second lateral surface WS2 to over a portion of the first main surface TS1 and a portion of the second main surface TS2. A portion of the fourth external electrode 6 located on the second lateral surface WS2 of the multilayer body 2 is referred to as the "fourth lateral surface electrode portion 6*b*", and portions of the fourth external electrode 6 covering the portion of the first main surface TS1 and the portion of the second main surface TS2 are referred to as the "fourth main surface electrode portions 6*a*".

Internal Electrode Layers

Internal electrode layers will be described with reference to FIGS. 2 to 5. As illustrated in FIGS. 2 and 3, the multilayer body 2 includes a plurality of dielectric layers 7 and a plurality of internal electrode layers stacked in the lamination direction T. The internal electrode layers include first internal electrode layers 8 and second internal electrode layers 9.

Planar Structures of Internal Electrode Layers

The planar structures of each first internal electrode layer 8 and each second internal electrode layer 9 will be described with reference to FIGS. 4 and 5. The planar structure as used herein refers to a structure observed as viewed in the lamination direction T of the multilayer ceramic capacitor 1. The first and second internal electrode layers 8 and 9 each have a portion superimposed on an adjacent one of these internal electrode layers with one of the dielectric layers 7 interposed therebetween, and portions prevented from being superimposed on the adjacent internal electrode layer, when stacked. The superimposed portion is referred to as the "counter electrode portion", and the portions prevented from being superimposed are referred to as the "extension portions".

Counter Electrode Portion

As illustrated in FIGS. 4 and 5, the counter electrode portion of each first internal electrode layer 8 is referred to as the "first counter electrode portion 8*a*", and the counter electrode portion of each second internal electrode layer 9 is referred to as the "second counter electrode portion 9*a*". The first and second counter electrode portions 8*a* and 9*a* have the same planar structure. A capacitance is generated between each first counter electrode portion 8*a* and the adjacent second counter electrode portion 9*a* superimposed one over the other. Thus, the multilayer ceramic capacitor 1 functions as a capacitor.

Extension Portions

The extension portions extend from the associated counter electrode portions to connect the counter electrode portions to the associated external electrodes. The extension portions of the first internal electrode layers 8 are different in position from those of the second internal electrode layers 9. Each first internal electrode layer 8 has its extension portions positioned so as to be each connected to an associated one of the first and second external electrodes 3 and 4. In contrast, each second internal electrode layer 9 has its extension portions positioned so as to be each connected to an associated one of the third and fourth external electrodes 5 and 6. The extension portions of the first internal electrode layer 8 are referred to as the "first and second extension portions 8*b* and 8*c*", and the extension portions of the second internal electrode layer 9 are referred to as the "third and fourth extension portions 9*b* and 9*c*". The first extension portion 8*b* connects the first counter electrode portion 8*a* and the first end surface electrode portion 3*c* together. The second extension portion 8*c* connects the first counter electrode portion 8*a* and the second end surface electrode portion 4*c* together. The third extension portion 9*b* connects the second counter electrode portion 9*a* and the third lateral surface electrode portion 5*b* together. The fourth extension portion 9*c* connects the second counter electrode portion 9*a* and the fourth lateral surface electrode portion 6*b* together.

LT Cross Section

An LT cross section of the multilayer ceramic capacitor 1 will be described with reference to FIG. 2. Large portions of each adjacent pair of the first and second internal electrode layers 8 and 9 in the length direction L of the multilayer ceramic capacitor 1 are superimposed one over the other. The superimposed portions each correspond to either the first counter electrode portion 8*a* or the second counter electrode portion 9*a*. The first internal electrode layers 8 have their first counter electrode portions 8*a* connected to the first end surface electrode portion 3*c* through the associated first extension portions 8*b*. Likewise, the first counter electrode portions 8*a* are connected to the second end surface electrode portion 4*c* through the associated second extension portions 8*c*. In contrast, the second internal electrode layers 9 are connected to neither the first external electrode 3 nor the second external electrode 4.

WT Cross Section

A WT cross section of the multilayer ceramic capacitor 1 will be described with reference to FIG. 3. Large portions of each adjacent pair of the first and second internal electrode layers 8 and 9 in the width direction W of the multilayer ceramic capacitor 1 are superimposed one over the other. The superimposed portions each correspond to either the first counter electrode portion 8*a* or the second counter electrode portion 9*a*. The second internal electrode layers 9 have their second counter electrode portions 9*a* connected to the third lateral surface electrode portion 5*b* through the associated third extension portions 9*b*. Likewise, the second counter electrode portions 9*a* are connected to the fourth lateral surface electrode portion 6*b* through the associated fourth extension portions 9*c*. In contrast, the first internal electrode layers 8 are connected to neither the third external electrode 5 nor the fourth external electrode 6.

Feedthrough Electrode and Ground Electrode

As described above, the first internal electrode layers 8 are connected to the first and second external electrodes 3 and 4. The first and second external electrodes 3 and 4 face each other in the length direction L, and each have the electrode portions located on five different surfaces of the multilayer body 2. In contrast, the second internal electrode layers 9 are connected to the third and fourth external electrodes 5 and 6. The third and fourth external electrodes 5 and 6 face each other in the width direction W, and each have the electrode portions located on three different surfaces of the multilayer body 2. Such a configuration allows the multilayer ceramic capacitor 1 to function as a three-terminal capacitor. The first internal electrode layers 8 function as feedthrough electrodes of the three-terminal capacitor, and the second internal electrode layers 9 function as ground electrodes of the three-terminal capacitor.

Width of Extension Portion

The multilayer ceramic capacitor 1 according to the example embodiment of the present invention is characterized by the width of the extension portions. This will be described with reference to FIGS. 4 to 6.

Width of Extension Portion of First Internal Electrode Layer

Figure 6:
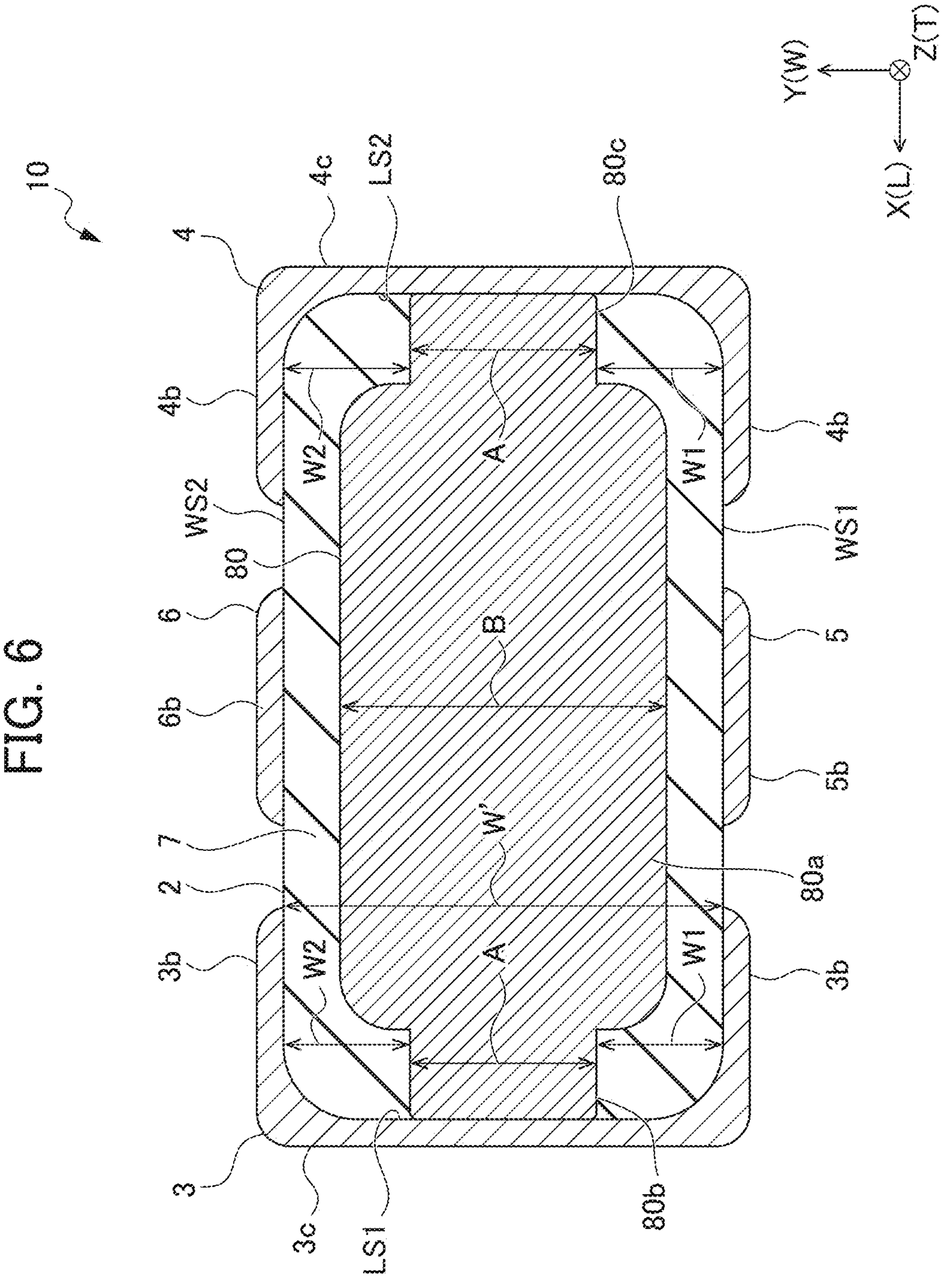
FIG. 6 corresponds to a cross-sectional view of the multilayer ceramic capacitor taken along line III-III illustrated in FIG. 1, and illustrates a planar structure of a known first internal electrode layer.

FIG. 4 is a cross-sectional view of a first internal electrode layer 8 of the multilayer ceramic capacitor 1 according to this example embodiment. FIG. 6 illustrates a planar structure of a first internal electrode layer 80 of a known multilayer ceramic capacitor 10. As described above, the planar structure as used herein refers to a structure observed as viewed in the lamination direction T of the multilayer ceramic capacitor 1. As is clear from a comparison between FIGS. 4 and 6, the first and second extension portions 8*b* and 8*c* of each first internal electrode layer 8 of this example embodiment have a smaller width in the width direction W than first and second extension portions 80*b* and 80*c* of the known first internal electrode layer 80 do. The first counter electrode portion 8*a* of the first internal electrode layer 8 of this example embodiment has the same shape as the first counter electrode portion 80*a* of the known first internal electrode layer 80. A specific description will now be given.

Dimensions of Extension Portions

In FIG. 4, the character "A" denotes the dimension of each of the first and second extension portions 8*b* and 8*c* in the width direction W. The character "B" denotes the dimension of the first counter electrode portion 8*a* in the width direction W. In addition, the character "W1" denotes the dimension from the side of each of the first and second extension portions 8*b* and 8*c* near the first lateral surface WS1 to the first lateral surface WS1 in the width direction W. The character "W2" denotes the dimension from the side of each of the first and second extension portions 8*b* and 8*c* near the second lateral surface WS2 to the second lateral surface WS2 in the width direction W.

In the multilayer ceramic capacitor 1 of this example embodiment, the dimension A is less than the dimension B, and is less than each of the dimensions W1 and W2. In other words, the expressions "dimension A<dimension B", "dimension A<dimension W1", and "dimension A<dimension W2" are satisfied.

Reduction in Separation

Thus, separation of the first and second extension portions 8*b* and 8*c* from the adjacent dielectric layers 7 near the first and second extension portions 8*b* and 8*c* can be reduced. Furthermore, separation of portions of the dielectric layers 7 apart from the first and second extension portions 8*b* and 8*c* from one another can be reduced.

Definitions of Regions

A region surrounded by each of the dotted lines in FIG. 4 is referred to as the "feedthrough extension region R1". The reason for this is that the first internal electrode layers 8 function as the feedthrough electrodes of the three-terminal capacitor. A region corresponding to the first counter electrode portions 8*a* of the first internal electrode layers 8 is referred to as the "effective region R2". The reason for this is that each adjacent pair of the first and second counter electrode portions 8*a* and 9*a* facing each other allow a capacitance to be generated therebetween.

The first and second extension portions 8*b* and 8*c* of the multilayer ceramic capacitor 1 of this example embodiment have their width in the width direction W reduced. This can reduce internal structural defects, such as separations, in the feedthrough extension region R1.

Cause of Delamination

A comparison between the effective region R2 and the feedthrough extension region R1 shows that delamination is more likely to occur in the feedthrough extension region R1 than in the effective region R2. The term delamination as used herein refers to separation of an internal electrode layer and a dielectric layer in contact with each other in the lamination direction T from each other, separation of dielectric layers in contact with each other in the lamination direction T from each other, or any similar type of separation. As described above, the first counter electrode portions 8*a* have the same planar structure as the second counter electrode portions 9*a*. Thus, in the effective region R2, the multilayer body 2 has a uniform or substantially uniform thickness. In addition, the effective region R2 occupies a large region of the WL cross section of the multilayer body 2. These causes make it difficult to produce delamination in the effective region R2. In contrast, each feedthrough extension region R1 includes a portion including the first extension portions 8*b* or the second extension portions 8*c*, and a portion including only the dielectric layers 7 stacked. Thus, in the feedthrough extension region R1, the multilayer body 2 is less likely to have a uniform thickness. The proportion of the feedthrough extension region R1 in the WL cross section of the multilayer body 2 is less than that of the effective region R2. Thus, the internal stress produced in the effective region R2 tends to be greater than the interlayer adhesive strength in the feedthrough extension region R1. This makes it easier to produce delamination in the feedthrough extension region R1.

The greater the number of the internal electrode layers stacked (i.e., the number of stacked layers) is, the more easily delamination occurs. One of the reasons for this is that the internal stress produced in the effective region R2 further increases. Another one of the reasons is that the multilayer body 2 is more likely to have a non-uniform thickness in the feedthrough extension region R1. There is a trend to increase the number of stacked layers to increase the capacitance of the multilayer ceramic capacitor 1. For example, the combined total number of the first internal electrode layers 8 and the second internal electrode layers 9 stacked may be 200 or more. This makes it easier to produce delamination in the feedthrough extension region R1.

The first and second extension portions 8*b* and 8*c* of each first internal electrode layer 8 are more likely to undergo delamination than the third and fourth extension portions 9*b* and 9*c* of each second internal electrode layer 9 are. The reason for this is that regions of the three-terminal capacitor located on both sides of each of extension portions of each feedthrough electrode (i.e., the first and second extension portions 8*b* and 8*c*) and including only the dielectric layers 7 stacked have a smaller area in the planar structure than those located on both sides of each of extension portions of each ground electrode (i.e., the third and fourth extension portions 9*b* and 9*c*).

The first and second extension portions 8*b* and 8*c* of the multilayer ceramic capacitor 1 of this example embodiment have their dimension in the width direction W reduced. Thus, even if the number of stacked layers is great, delamination is less likely to occur in the feedthrough extension region R1. Sufficiently large regions including only the dielectric layers 7 stacked can be provided on both sides of each of the first and second extension portions 8*b* and 8*c* in the width direction W. This can improve the interlayer adhesion, and can enhance the interlayer adhesive strength.

Note that the above-described delamination may occur in various situations. For example, in the process of fabricating a multilayer ceramic capacitor 1, in the process of mounting the multilayer ceramic capacitor 1 on a board, or during the use of the multilayer ceramic capacitor 1 as a portion of a product, delamination may occur.

In addition, the dimensions W1 and W2 are preferably greater than or equal to about 0.375×W', for example, where W' represents the dimension of the multilayer body 2 in the width direction W. The dimension A is preferably equal to or less than about 0.25×W', for example. In other words, the expressions "W1≥0.375×W'" and "W2≥0.375×W'" are preferably satisfied, for example. The expression "A≤0.25×W'" is preferably satisfied, for example. These expressions will be described with reference to FIG. 4. In FIG. 4, W' denotes the dimension of the multilayer body 2 in the width direction W. If attention is paid to one side of each extension portion in the width direction W, about ½ of the width of the extension portion in the width direction W is preferably equal to or less than about ⅛ of the dimension W', for example. The first extension portion 8*b* in FIG. 4 will be described by way of example. One half of the width of the first extension portion 8*b* in the width direction W (i.e., about ½ of the dimension A) is set to be equal to or less than about ⅛ of the dimension W', for example. Setting the width of the first extension portion 8*b* in the width direction W within the above-described range can further reduce delamination in the feedthrough extension region R1. The reason for this is that achieving a greater dimension W1 can improve the interlayer adhesion, and can enhance the interlayer adhesive strength.

If the expression "½A≤⅛W'" is set to be satisfied, for example, the expression "W1≥0.375×W'" is derived from the expression "W1=½W'−½A". A preferable range of the dimension W2 is expressed by "W2≥0.375×W'", for example, just like that of the dimension W1.

Furthermore, if the expression "½A≤⅛W'" is set to be satisfied, the expression "A≤¼W'" is derived, and thus a preferable range of the dimension A is expressed by "A≤0.25W'", for example.

Width of Extension Portion of Second Internal Electrode Layer

Each second internal electrode layer 9 will be described with reference to FIG. 5. In FIG. 5, the character "C" denotes the dimension of each of the third and fourth extension portions 9*b* and 9*c* in the length direction L. The character "D" denotes the dimension of the second counter electrode portion 9*a* in the length direction L. A region surrounded by each of the dotted lines in FIG. 5 is referred to as the "ground extension region R3". The reason for this is that the second internal electrode layer 9 functions as a ground electrode of the three-terminal capacitor. In the multilayer ceramic capacitor 1 of this example embodiment, the dimension C is less than the dimension D. In other words, the expression "dimension C<dimension D" is satisfied. Thus, delamination is less likely to occur even near the third and fourth extension portions 9*b* and 9*c*. Sufficiently large regions including only the dielectric layers 7 stacked can be provided on both sides of each of the third, fourth extension portions 9*b*, 9*c* in the length direction L. This can improve the interlayer adhesion, and can enhance the interlayer adhesive strength.

The dimension A is preferably equal to or less than about 1.5 times the dimension C, for example. In other words, the expression "the dimension A<1.5C" is preferably satisfied, for example. Thus, the ratio of the dimension of each of the first and second extension portions 8*b* and 8*c* in the width direction W to that of each of the third and fourth extension portions 9*b* and 9*c* in the length direction L can be relatively lower. This allows the internal stress produced in the effective region R2 to be moderately shared by, and to be distributed among, the feedthrough extension region R1 and the ground extension regions R3. This can further reduce delamination.

The relation between the above-described dimensions and delamination will be described with reference to FIG. 7. FIG. 7 shows the relation between dimensions of different portions and delamination. The delamination shown in FIG. 7 was evaluated through a thermal shock test for a multilayer ceramic capacitor 1 alone. A requirement for the thermal shock is that 500 cycles be performed where each of the cycles is performed at +85° C. for 30 minutes and at −40° C. for 30 minutes. An evaluation was made, by visual observation, whether or not delamination had occurred. If no delamination was observed by visual observation, the evaluation result was determined to be "excellent" (indicated by the bullseye symbol (⊙)); if there was no practical problem while a slight sign of delamination was observed, the evaluation result was determined to be "good" (indicated by the circle symbol (○)); and if delamination was observed, the evaluation result was determined to be a "fail" (indicated by the cross symbol (x)).

As shown in the second example, if the dimension A was less than the dimension B, and the dimensions W1 and W2 were each greater than the dimension A, the result of evaluating delamination was "excellent". In contrast, as shown in the first comparative example, if the dimension A was not less than the dimension B, and the dimensions W1 and W2 were not each greater than the dimension A, the result of evaluating delamination was a "fail".

A comparison between the second example and the fourth example shows that if the dimensions W1 and W2 were each greater than or equal to about 0.375×W' (i.e., in the second example), the result of evaluating delamination was better than if the dimensions W1 and W2 were not each greater than or equal to about 0.375×W' (i.e., than in the fourth example), for example.

A comparison between the second example and the fourth example shows that if the dimension A was less than or equal to about 0.25×W' (i.e., in the second example), the result of evaluating delamination was better than if the dimension A was not less than or equal to about 0.25×W' (i.e., than in the fourth example), for example.

A comparison between the second example and the third example shows that if the dimension C was less than the dimension D (i.e., in the second example), the result of evaluating delamination was better than if the dimension C was not less than the dimension D (i.e., than in the third example).

A comparison between the second example and the fifth example shows that if the dimension A was less than about 1.5 times the dimension C (i.e., in the second example), the result of evaluating delamination was better than if the dimension A was not less than about 1.5 times the dimension C (i.e., than in the fifth example), for example.

Materials and other elements of components will now be described.

Material of Dielectric

The plurality of dielectric layers 7 are made of a dielectric material. The dielectric material may be a dielectric ceramic including an ingredient, such as $BaTiO_3$, $CaTiO_3$, $SrTiO_3$, or $CaZrO_3$. The dielectric material may include an accessory ingredient, such as a Mn compound, an Fe compound, a Cr compound, a Co compound, or a Ni compound, added to these main ingredients.

Thickness and Number of Dielectric Layers

The thickness of the dielectric layers 7 is not specifically limited, but is preferably greater than or equal to about 0.5 μm and equal to or less than about 3.0 μm, for example. The number of the dielectric layers 7 is not specifically limited, but is preferably 200 or more, for example.

Material of Internal Electrode Layers

The first internal electrode layers 8 and the second internal electrode layers 9 include, for example, a metal Ni as the main ingredient. The first internal electrode layers 8 and the second internal electrode layers 9 may include at least one selected from a metal, such as Cu, Ag, Pd, or Au, or an alloy including at least one of these metals, such as an Ag—Pd alloy, as the main ingredient or as an ingredient except the main ingredient. The first internal electrode layers 8 and the second internal electrode layers 9 may further include dielectric particles in the same composition system as that of the ceramic contained in the dielectric layers 7 as an ingredient except the main ingredient. Note that the metal as the main ingredient as used herein is a metal component with the highest percentage by mass.

Thickness and Number of Internal Electrode Layers

The thickness of the first internal electrode layers 8 and the second internal electrode layers 9 is not specifically limited, but is preferably greater than or equal to about 0.4 μm and equal to or less than about 1.5 μm, for example. The total number of the first internal electrode layers 8 and the second internal electrode layers 9 is not specifically limited, but is preferably 200 or more, for example.

Material of External Electrodes

The external electrodes each include a base electrode, an inner plated layer, and an outer plated layer. The base electrode can be a sintered layer including a metal and glass. The metal includes Cu as the main ingredient. The metal may contain at least one selected from a metal, such as Ni, Ag, Pd, or Au, or an alloy, such as an Ag—Pd alloy, as the main ingredient or as an ingredient except the main ingredient. Examples of the glass include a glass component including at least one selected from B, Si, Ba, Mg, Al, Li, or any other material. Borosilicate glass can be used as a specific example of the glass. The inner plated layer can be made of at least one selected from a metal, such as Cu, Ni, Ag, Pd, or Au, or an alloy, such as an Ag—Pd alloy. The outer plated layer can be made of a metal, such as Sn.

Dimensions of Multilayer Body

The dimensions of the multilayer body 2 described above are not specifically limited. However, for example, the dimension from the first end surface LS1 to the second end surface LS2 of the multilayer ceramic capacitor 1 in the length direction L is preferably about 1.0 mm, the dimension from the first lateral surface WS1 to the second lateral surface WS2 of the multilayer ceramic capacitor 1 in the width direction W is preferably about 0.7 mm, and the dimension from the first main surface TS1 to the second main surface TS2 of the multilayer ceramic capacitor 1 in the lamination direction T is preferably about 0.5 mm, for example.

Measurement Method

Examples of a measurement method for the lengths of the dielectric layers 7 and the internal electrode layers include a process in which a cross section of a multilayer body exposed by polishing is observed with a scanning electron microscope. Resultant values can be set to be the average of values obtained by measuring a plurality of portions corresponding to a region to be measured.

Fabrication Method

An example of a typical method for fabricating a multilayer ceramic capacitor 1 will be described. First, dielectric sheets for dielectric layers 7 and electrically conductive paste for first and second internal electrode layers 8 and 9 are prepared. The dielectric sheets and the electrically conductive paste include a binder and a solvent. A known material can be used as each of the binder and the solvent. Next, the electrically conductive paste is printed on a dielectric sheet in a pattern of a first internal electrode layer 8 or a second internal electrode layer 9 to form an internal electrode layer pattern on the dielectric sheet. Screen printing, gravure printing, or any other method can be used as a method for forming an internal electrode layer pattern. Next, a predetermined number of outer-layer dielectric sheets on each of which the internal electrode layer pattern has not been printed are stacked. Inner-layer dielectric sheets on each of which the internal electrode layer pattern has been printed are successively stacked on a stack of the outer-layer dielectric sheets. Meanwhile, dielectric paste for thickness correction may be appropriately applied to portions of the dielectric sheets corresponding to side gap portions as needed. A predetermined number of outer-layer dielectric sheets on each of which the internal electrode layer pattern has not been printed are stacked on the resultant stack. Thus, a multilayer sheet is produced.

Next, the multilayer sheet is pressed in the lamination direction by isostatic pressing, for example, to produce a multilayer block. Next, the multilayer block is cut into a predetermined size to obtain a multilayer chip. At this time, corners and ridges of the multilayer chip are rounded by barrel polishing or any other process. Next, the multilayer chip is fired to produce a multilayer body 2. Depending on the materials of the dielectric and the internal electrode layers, the firing temperature is preferably higher than or equal to about 900° C. and equal to or lower than about 1400° C., for example. Next, forming the external electrodes by a predetermined method can provide a multilayer ceramic capacitor 1.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including first and second main surfaces that face each other in a lamination direction, first and second end surfaces that face each other in a length direction orthogonal or substantially orthogonal to the lamination direction, and first and second lateral surfaces that face each other in a width direction orthogonal or substantially orthogonal to the lamination direction and the length direction;

a plurality of internal electrode layers including a plurality of first internal electrode layers, the first internal electrode layers extending to the first and second end surfaces, and a plurality of second internal electrode layers, the second internal electrode layers extending to the first and second lateral surfaces;

a first external electrode on the first end surface, the first external electrode being connected to the first internal electrode layers;

a second external electrode on the second end surface, the second external electrode being connected to the first internal electrode layers;

a third external electrode on the first lateral surface, the third external electrode being connected to the second internal electrode layers;

a fourth external electrode on the second lateral surface, the fourth external electrode being connected to the second internal electrode layers;

the first internal electrode layers each including a first counter electrode portion that faces an associated one of the second internal electrode layers, a first extension portion extending from the first counter electrode portion to the first end surface, and a second extension portion extending from the first counter electrode portion to the second end surface;

the second internal electrode layers each including a second counter electrode portion that faces an associated one of the first internal electrode layers, a third extension portion extending from the second counter electrode portion to the first lateral surface, and a fourth extension portion extending from the second counter electrode portion to the second lateral surface;

a dimension A of at least one of the first or second extension portions in the width direction being less than a dimension B of the corresponding first counter electrode portion in the width direction; and a dimension W1 from a side of the at least one of the first or second extension portions near the first lateral surface to the first lateral surface in the width direction and a dimension W2 from a side of the at least one of the first or second extension portions near the second lateral surface to the second lateral surface in the width direction being each greater than the dimension A of the at least one of the first or second extension portions in the width direction; wherein the dimension A is equal to or less than about 1.5 times a dimension C of at least one of the third or fourth extension portions in the length direction.

2. The multilayer ceramic capacitor according to claim 1, wherein the first external electrode extends from over the first end surface to over a portion of the first main surface, a portion of the second main surface, a portion of the first lateral surface, and a portion of the second lateral surface;

the second external electrode extends from over the second end surface to over a portion of the first main surface, a portion of the second main surface, a portion of the first lateral surface, and a portion of the second lateral surface;

the third external electrode extends from over the first lateral surface to over a portion of the first main surface and a portion of the second main surface; and the fourth external electrode extends from over the second lateral surface to over a portion of the first main surface and a portion of the second main surface.

3. The multilayer ceramic capacitor according to claim 1, wherein the dimensions W1 and W2 are each greater than or equal to about 0.375×W', where W' represents a dimension of the multilayer body in the width direction.

4. The multilayer ceramic capacitor according to claim 1, wherein the dimension A is equal to or less than about 0.25×W', where W' represents a dimension of the multilayer body in the width direction.

5. The multilayer ceramic capacitor according to claim 1, wherein the dimension C of the at least one of the third or fourth extension portions in the length direction is less than a dimension D of the corresponding second counter electrode portion in the length direction.

6. The multilayer ceramic capacitor according to claim 1, wherein a combined total number of the first internal electrode layers and the second internal electrode layers stacked is 200 or more.

7. The multilayer ceramic capacitor according to claim 1, wherein a dimension from the first end surface to the second end surface of the multilayer ceramic capacitor in the length direction is about 1.0 mm, a dimension from the first lateral surface to the second lateral surface of the multilayer ceramic capacitor in the width direction is about 0.7 mm, and a dimension from the first main surface to the second main surface of the multilayer ceramic capacitor in the lamination direction is about 0.5 mm.

8. The multilayer ceramic capacitor according to claim 1, wherein the multilayer body has a rectangular or substantially rectangular parallelepiped shape.

9. The multilayer ceramic capacitor according to claim 1, wherein the multilayer body includes corners and ridges that are rounded.

10. The multilayer ceramic capacitor according to claim 1, wherein the multilayer ceramic capacitor is a three-terminal capacitor.

11. The multilayer ceramic capacitor according to claim 3, wherein about ½ of the width of the first extension portion is equal to or less than about ⅛ of W'.

12. The multilayer ceramic capacitor according to claim 1, wherein the multilayer body further includes a plurality of dielectric layers; and each of the plurality of dielectric layers includes a dielectric ceramic.

13. The multilayer ceramic capacitor according to claim 12, wherein the dielectric ceramic includes $BaTiO_3$, $CaTiO_3$, $SrTiO_3$, or $CaZrO_3$.

14. The multilayer ceramic capacitor according to claim 13, wherein the dielectric ceramic includes a Mn compound, an Fe compound, a Cr compound, a Co compound, or a Ni compound.

15. The multilayer ceramic capacitor according to claim 1, wherein the multilayer body further includes a plurality of dielectric layers; and a thickness of each of the plurality of dielectric layers is about 0.5 μm and equal to or less than about 3.0 μm.

16. The multilayer ceramic capacitor according to claim 1, wherein the multilayer body further includes a plurality of dielectric layers; and a total number of the plurality of dielectric layers in the multilayer body is 200 or more.

17. The multilayer ceramic capacitor according to claim 1, wherein each of the plurality of internal electrodes includes Ni, Cu, Ag, Pd, or Au, or an alloy including at least one of Ni, Cu, Ag, Pd or Au.

18. The multilayer ceramic capacitor according to claim 17, wherein each of the plurality of internal electrodes further include dielectric particles.

19. The multilayer ceramic capacitor according to claim 1, wherein a thickness of each of the plurality of internal electrode layers is about 0.4 μm and equal to or less than about 1.5 μm.

* * * * *